Figure 1:
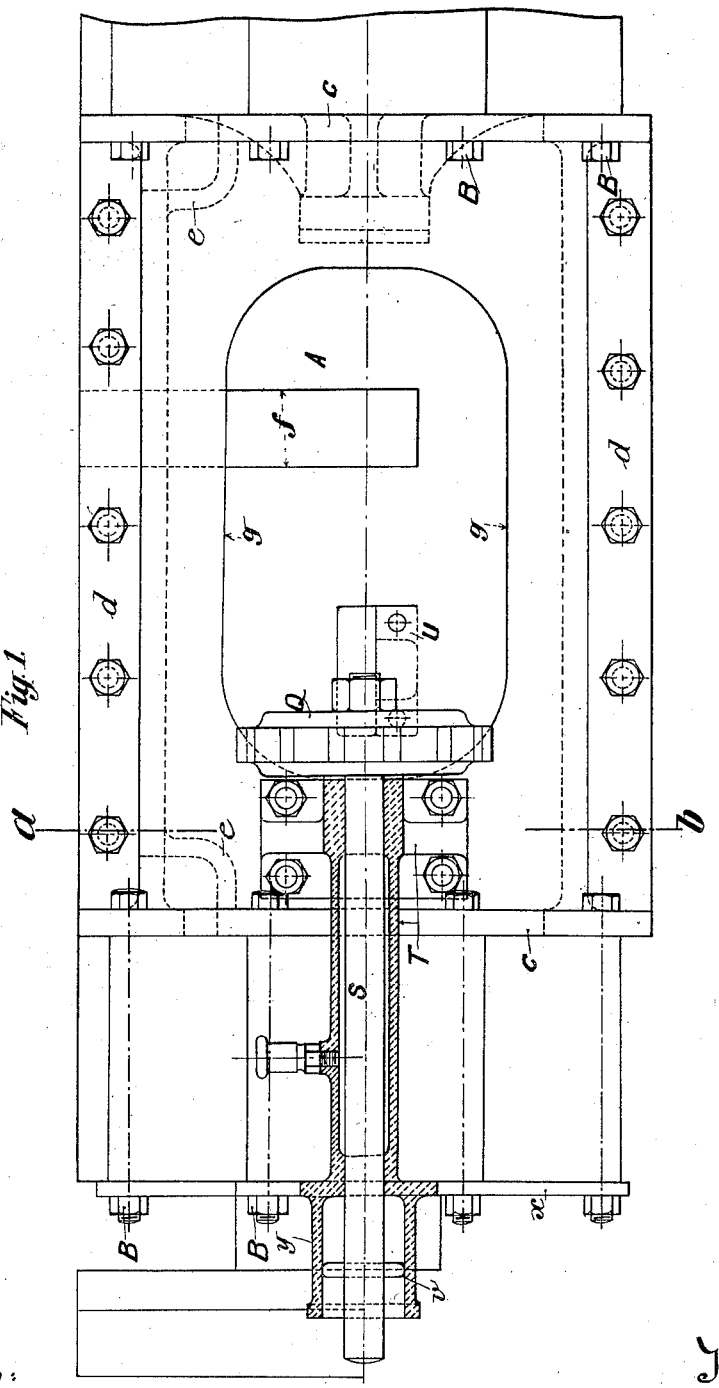

No. 662,816. Patented Nov. 27, 1900.
A. PITON.
CLUTCH.
(Application filed Jan. 13, 1900.)

(No Model.) 3 Sheets—Sheet 1.

Witnesses: Inventor:
Alfred Piton
per
Attorney

No. 662,816. Patented Nov. 27, 1900.
A. PITON.
CLUTCH.
(Application filed Jan. 12, 1900.)
(No Model.) 3 Sheets—Sheet 2.
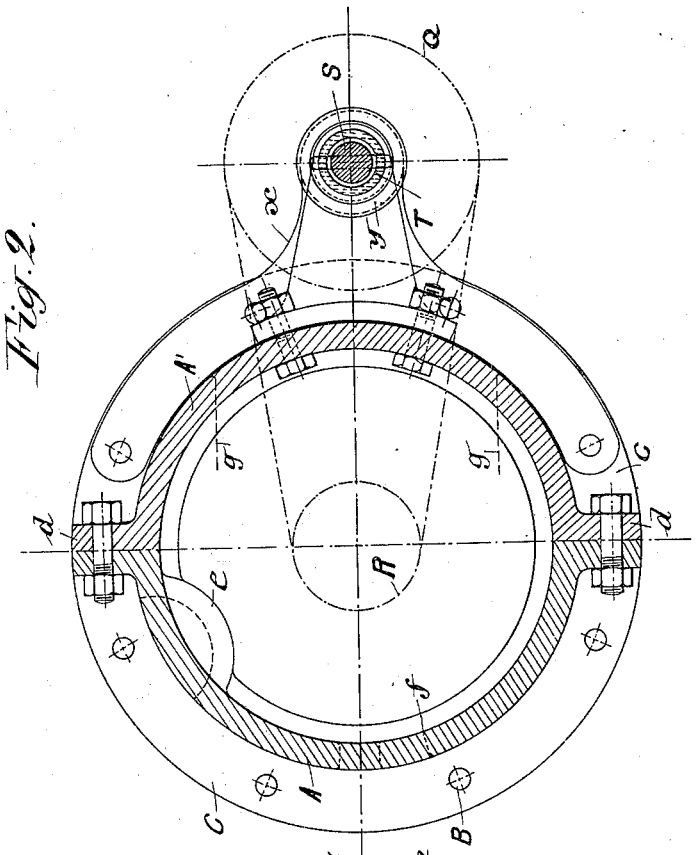
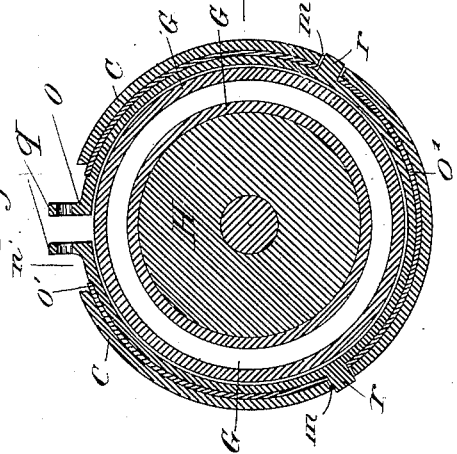
Witnesses: Inventor: Alfred Piton
per Attorney.

No. 662,816. Patented Nov. 27, 1900.
A. PITON.
CLUTCH.
(Application filed Jan. 13, 1900.)
(No Model.) 3 Sheets—Sheet 3.
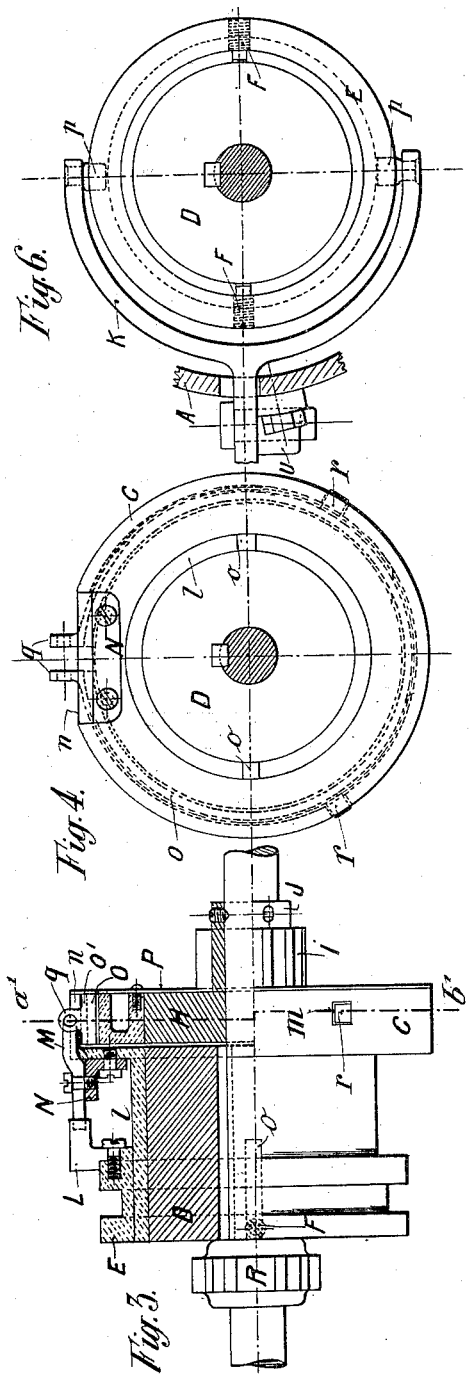
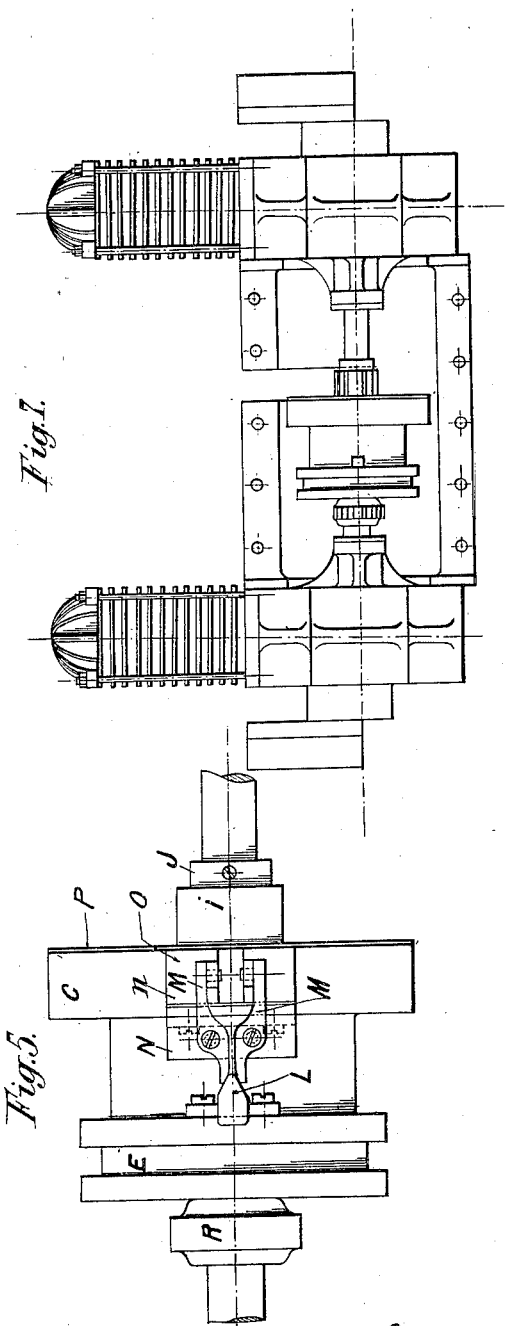
Witnesses:
Inventor:
Alfred Piton
per
Attorney.

UNITED STATES PATENT OFFICE.

ALFRED PITON, OF LILLE, FRANCE.

CLUTCH.

SPECIFICATION forming part of Letters Patent No. 662,816, dated November 27, 1900.

Application filed January 13, 1900. Serial No. 1,383. (No model.)

*To all whom it may concern:*

Be it known that I, ALFRED PITON, a citizen of the Republic of France, and a resident of Lille, France, have invented certain new and useful Improvements in Clutch Devices for Motors, of which the following is a specification.

The object of my present invention is to provide a clutch device for motors; and it consists in the construction, arrangement, and combination of parts hereinafter fully described and claimed.

In the accompanying drawings, Figure 1 is a view of the clutch or coupling-drum with parts shown in section, the section being through the starting device. Fig. 2 is a section on line $a\,b$ of Fig. 1. Fig. 3 is an elevation of the friction-clutch with parts shown in section. Fig. 4 is an end view of same with the collar removed. Fig. 5 is a plan view of same. Fig. 5$^a$ is a section on line $a'\,b'$ of Fig. 3. Fig. 6 is an end view of the collar and of the clutch-fork of the device. Fig. 7 shows the improved clutch device mounted on the shaft of the motors coupled together by means of the drum.

The improved clutch or coupling device comprises three main parts—first, the coupling-drum; second, the friction-clutch, and, third, the starting device.

*Coupling-drum.*—Referring to Figs. 1 and 2, the coupling-drum, made of alloy of aluminium and tungsten, is formed of two half-cylinders A and A', provided with flanges $c$, receiving the bolts B of the motors, (eight bolts per motor.) Said half-cylinders are provided with flanges $d$, bolted together. The upper part of the semicylinder A is provided with two recesses $e$, serving to receive the attaching parts, and with an aperture $f$, Fig. 1, to clear the gearing operating the vehicle. The semicylinder A' is provided with an aperture $g$, Fig. 1, giving access to the gearing, &c. Said aperture is closed in any desired way. The motors, previously connected by a single driving-shaft with the pistons simultaneously at the bottom of their stroke, but the explosions regulated so as to act alternately, are arranged on the sides of the drum and rigidly secured thereto by means of bolts B, and said drum will protect the internal mechanism of the motors (clutch-pinion, &c.) against dust, concussions, or any ordinary accidents. The device may be easily taken apart. All that is necessary is to remove the bolts from the flanges $d$ and the bolts from the circular flanges corresponding to the parts A A', Fig. 1.

*Friction-clutch.*—This is composed of five parts:

First. A bronze pulley C, provided with a cylinder $l$, Fig. 3, and having on its periphery three recesses, the two smallest of which, $m$, serve to receive the clutch-pins $r$, while the largest, $n$, receives the ears $q$ of the blade, Fig. 3. The cylinder $l$ is provided with two diametrically-arranged grooves $o$, Figs. 3 and 4, engaged by the screws F. Near the larger recess $n$ is arranged a plate N, serving to support the pivoted levers M, Figs. 3 and 4. The pulley C is keyed upon a steel sleeve D, keyed upon the common shaft of the motors.

Second. A bronze friction-drum G, Fig. 3, keyed upon a steel sleeve H, carrying the operating-pinion I, said sleeve being loosely mounted on the shaft and pressed against the other sleeve by means of a collar J, secured on the motor-shaft by means of three pointed screws.

Third. A clutch-collar E, Fig. 3, keyed upon the cylinder $l$ by means of screws F engaging the grooves $o$ and adapted to slide on $l$. Said collar is provided with a groove engaged by the rollers $p$ of the clutch-fork K, Fig. 6. This collar E carries a tempered-steel wedge L, Figs. 3 and 5, extending between the levers M.

Fourth. A tightening-blade O, Figs. 3 and 4, made of steel and lined with leather O' (see also Fig. 5$^a$) on the face turned toward the pulley C. Said blade is provided with two ears $q$ and two tenons or pins $r$, the former receiving the ends of lever M.

Fifth. Of a brass plate P, Fig. 3, protecting the blade and drum against the oil projected from the pinion I of the gearing.

If it is desired to take off the blade, I remove the plate P and the levers M, whereupon the blade may be moved outwardly.

The clutch device operates as follows: The apparatus being out of gear, the wedge is withdrawn from the levers M and the blade bears against the inner wall of the pulley C. The motors being then rotated, the pulley will be carried away in this movement as well as the parts connected therewith; but the drum G being loose on the shaft will remain stationary; but when the wedge is pushed between the levers M the latter are moved apart from each other, while their tails or ends and the ears $q$ are moved to each other. Then the clutch-blade will be pressed against the drum, which is thus thrown into engagement. When this is slowly effected, the vehicle will be started very smoothly.

*Starting device.*—This comprises a sprocket-wheel Q, actuating another wheel R, keyed upon the common shaft of the motors. Said wheel is actuated by means of a shaft S, Fig. 1, provided with a pin $v$, serving to receive corresponding notches or recesses provided in a crank. A bearing T connects said shaft to the coupling-drum by means of four bolts. A plate $x$, cast with the bronze bearing, is secured by means of the bolts B of the left-hand motor and serves to hold the end of the axle S. A sleeve $y$, fitted over said end, prevents accidents.

Having fully described my invention, what I claim, and desire to secure by Letters Patent, is—

In the improved clutch device for motors, the combination with the clutch or coupling drum, made of two semicylinders provided with means to secure the motors thereto, said semicylinders being suitably secured together; a recess and an aperture in the upper semicylinder, another aperture in the lower semicylinder adapted to be closed by means of a plate and serving to make the clutch accessible, of a friction-clutch embodying: a pulley C having a cylinder $l$ and provided with three recesses, pins $r$ engaging two of said recesses, the other recess receiving the ears of a blade O; pivoted levers M between which said ears may be passed; a sleeve upon which said pulley is keyed, said sleeve keyed on the common shaft of the motors, a friction-drum; a clutch-collar keyed on cylinder $l$ and adapted to slide on the latter, a wedge L on said collar adapted to move between the pivoted levers M, a tightening-blade O lined with leather, and a protecting-plate; and of starting device embodying: a sprocket or chain wheel, another wheel actuated by the same and keyed on the common shaft of the motors, said wheel actuated by means of a shaft, provided with pins adapted to engage the notches of a crank; and a bearing connecting the shaft to the coupling-drum by means of bolts, or equivalents, substantially as set forth.

In testimony whereof I have hereunto set my hand in presence of two witnesses.

ALFRED PITON.

Witnesses:
 LOUIS DEROLING,
 LOUIS ALFRED SIFFERT.